(12) United States Patent
Hsu

(10) Patent No.: US 7,701,527 B2
(45) Date of Patent: Apr. 20, 2010

(54) DISPLAY DEVICE

(75) Inventor: Ming-Fu Hsu, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 933 days.

(21) Appl. No.: 11/445,425

(22) Filed: Jun. 1, 2006

(65) Prior Publication Data
US 2006/0274223 A1  Dec. 7, 2006

(30) Foreign Application Priority Data
Jun. 1, 2005  (CN) .................. 2005 1 0035088

(51) Int. Cl.
*G02F 1/1333*  (2006.01)
*G02F 1/1335*  (2006.01)
(52) U.S. Cl. .......................... 349/58; 349/61
(58) Field of Classification Search .............. 349/58–69
See application file for complete search history.

(56) References Cited
U.S. PATENT DOCUMENTS 5,334,993 A    8/1994  Okajima et al.
5,666,172 A *  9/1997  Ida et al. .................. 349/58
6,814,458 B2 * 11/2004 Kim et al. .................. 362/632
6,910,782 B2 *  6/2005 Ho .......................... 362/632
2005/0068472 A1 * 3/2005 Sung et al. ................. 349/64

* cited by examiner

Primary Examiner—Dung T. Nguyen
(74) Attorney, Agent, or Firm—Clifford O. Chi

(57) ABSTRACT

A display device (200) includes a first frame (210), a backlight module (220), a display panel (230), and a second frame (240), in that order. A groove (211) is defined at one end of the first frame. The backlight module includes a light guide plate (221) and a light source device (222). The light guide plate includes a light incident surface (2211), a light emitting surface (2212) and a bottom surface (2213). The light source device is located at one end of the light incident surface of the light guide plate and received in the groove of the first frame. The display panel is located between the backlight module and the second frame. A locking portion (241) is formed at one end of the second frame. The locking portion is engaged with the groove. The first frame is engaged with the second frame.

17 Claims, 11 Drawing Sheets

DISPLAY DEVICE

1. TECHNICAL FIELD

The present invention generally relates to a backlight module and, more particularly, to a display device having the backlight module.

2. BACKGROUND

Most liquid crystal display (LCD) devices are passive devices in which images are displayed by controlling an amount of light input from an external light source. Thus, a separate light source (for example, backlight module) is generally employed for illuminating an LCD.

Generally, backlight modules can be classified into an edge type or a direct type based upon the arrangement of lamps within the device. The edge type backlight module has a lamp unit arranged at a side portion of a light guiding plate for guiding light. These edge type backlight modules are commonly employed in small-sized LCDs due to their lightweight, miniature and low electric consumption.

One kind of display device is illustrated in FIG. 1. The display device 100 includes a first frame 102, a backlight module 110, a display panel 160, and a second frame 104 stacked upon each other in that order. The first frame 102 is engaged with the second frame 104 so as to hold the display device 100 together.

The backlight module 110 includes a light guide plate 120, a reflective sheet 130, a light source device 140, and an optical correcting unit 150. The reflective sheet 130 is attached to the first frame 102. The light guide plate 120 includes a light incident surface 121, a light emitting surface 122 connected with the light incident surface 121, and a bottom surface 123 facing an opposite direction of the light emitting surface 122. The light guide plate 120 is located between the reflective sheet 130 and the optical correcting unit 150, with the bottom surface 123 adjacent to the reflective sheet 130 and the light emitting surface 122 adjacent to the optical correcting unit 150. The optical correcting unit 150 includes a diffusion sheet 151, a first brightness enhancement sheet 152, a second brightness enhancement sheet 153, and a hood light sheet 154, stacked in that order. The light guide plate 120, the reflective sheet 130, and the optical correcting unit 150 are all made of plastic material. The light source device 140 is located at one end of the light incident surface 121 of the light guide plate 120. The light source device 140 includes a light source 141 and a reflector 142 partially surrounding the light source 141. The reflector is configured for focusing light produced by the light source 141 so that most of the light is emitted to the light guide plate 120, and to increase utilization efficiency of light energy.

However, the backlight module 110 needs the reflector 142 for light focusing, and the cost of the reflector 142 is high and extra, thus, giving a high cost on the overall unit. On the other hand, some light may disappear through an edge of the reflector 142, thereby causing light energy loss. Furthermore, the light source 141 produces a great deal of heat that accumulates inside the display device 100. This causes plastic elements, for example, the light guide plate 120, the reflective sheet 130, and the optical correcting unit 150, to overheat and deform, resulting a lower display quality of the display device 100. Therefore, heat dissipation of the display device 100 is usually a hard nut to crack.

Therefore, a new display device is desired in order to overcome the above-described shortcomings.

SUMMARY

A display device includes a first frame, a backlight module, a display panel, and a second frame, in that order. A groove is defined at one end of the first frame. The backlight module includes a light guide plate and a light source device. The light guide plate includes a light incident surface, a light emitting surface and a bottom surface. The light source device is located at one end of the light incident surface of the light guide plate and received in the groove of the first frame. The display panel is located between the backlight module and the second frame. A locking portion is formed at one end of the second frame. The locking portion is engaged with the groove. The first frame is engaged with the second frame.

Other novel features will become more apparent from the following detailed description when taken in conjunction with the accompanying drawings.

BRIEF DESCRIPTION OF THE DRAWINGS

Many aspects of the display device can be better understood with reference to the following drawings. The components in the drawings are not necessarily drawn to scale, the emphasis instead being placed upon clearly illustrating the principles of the present display device. Moreover, in the drawings, like reference numerals designate corresponding parts throughout the several views.

DETAILED DESCRIPTION OF THE EMBODIMENTS

Figure 1:
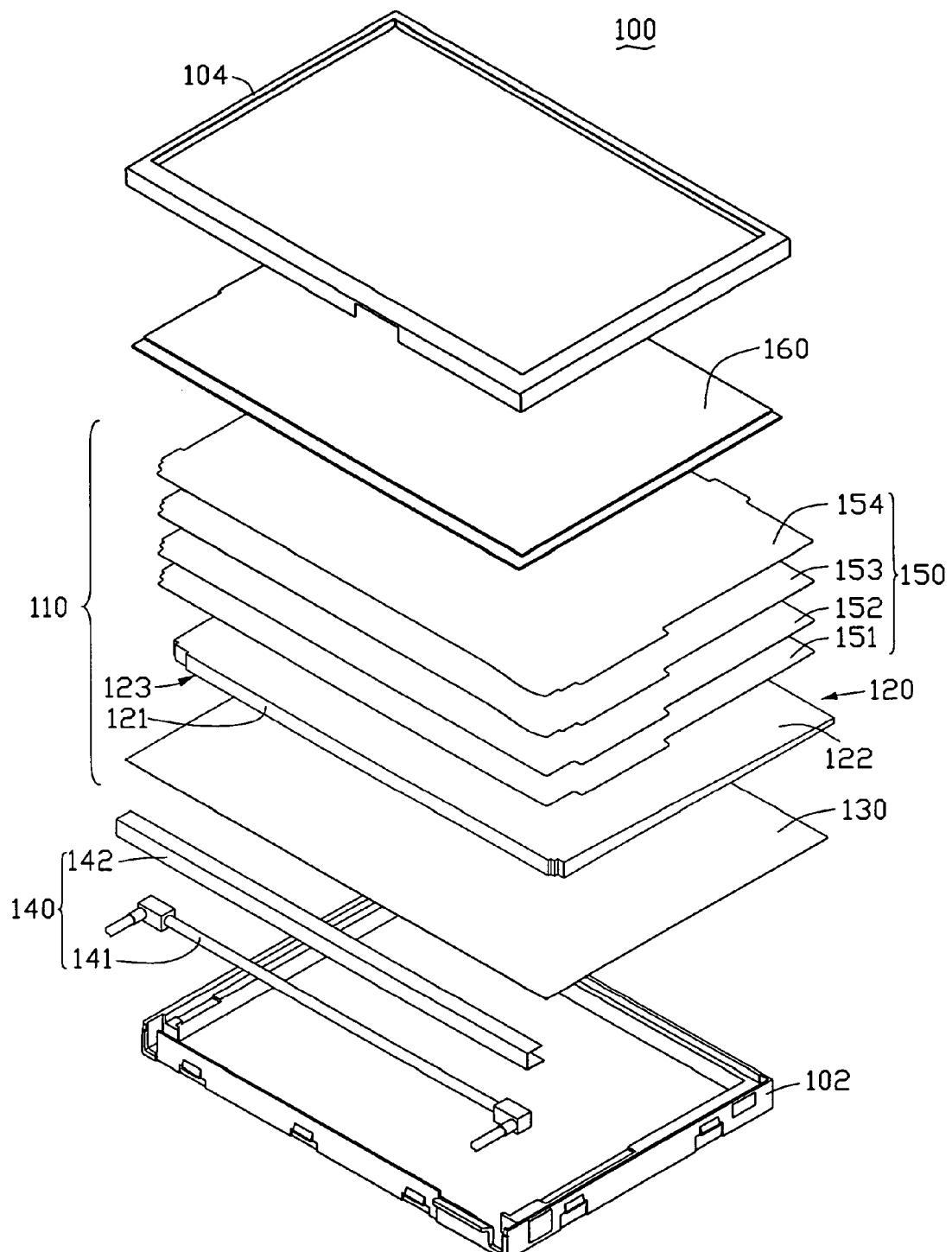
FIG. 1 is a schematic, exploded perspective view of a conventional display device.
Figure 2:
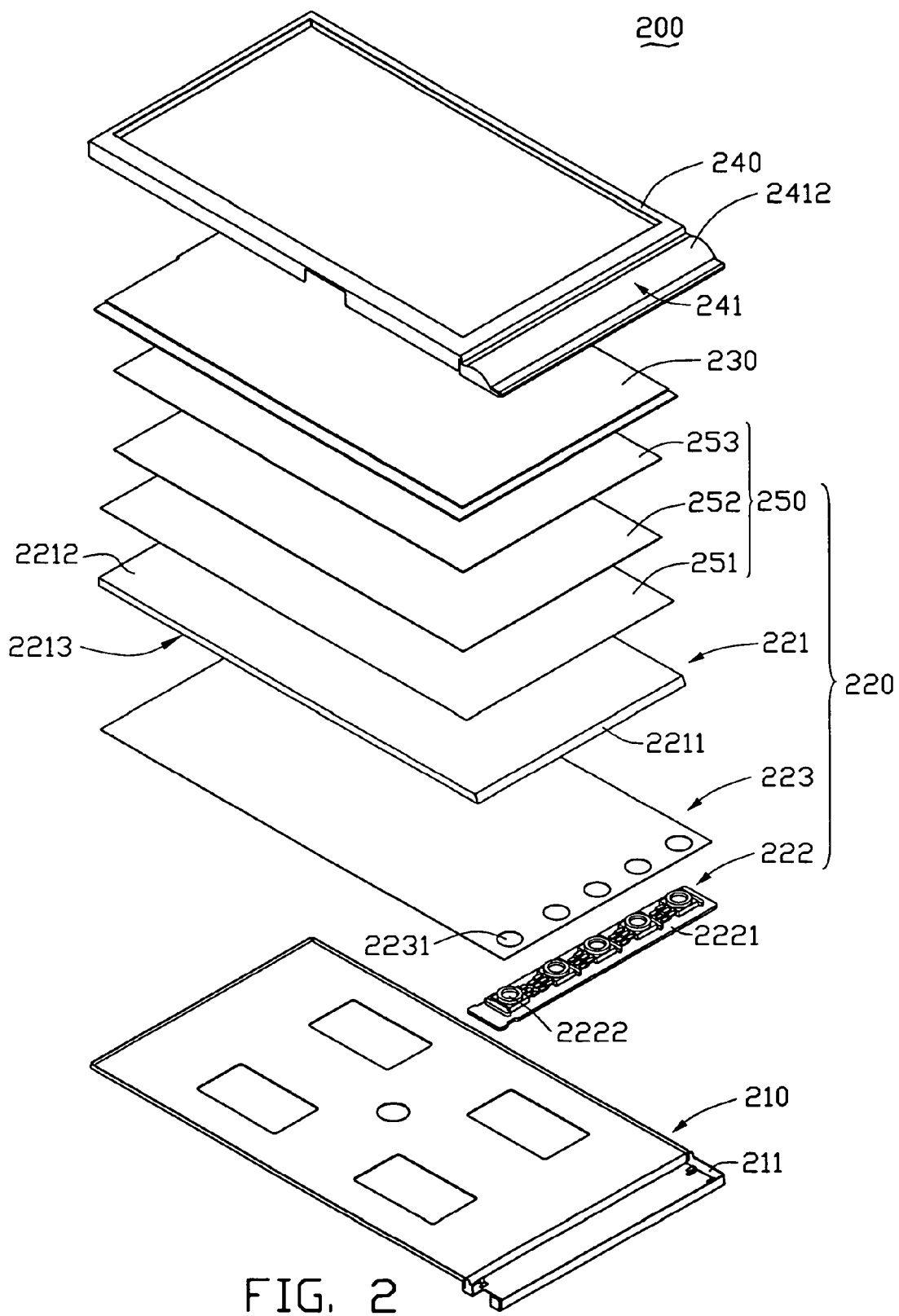
FIG. 2 is a schematic, exploded perspective view of a display device in accordance with a first embodiment of the present invention.

Referring to FIG. 2, a display device 200 according to a first embodiment of the present invention includes a first frame 210, a backlight module 220, a display panel 230, and a second frame 240 stacked on top of each other in that order. A groove 211 is defined at one end of the first frame 210. A locking portion 241 used as a reflector is formed at one end of the second frame 240, and the locking portion 241 is engaged with the groove 211. The first frame 210 is engaged with the second frame 240 and they are coordinately integrated.

Figure 3:
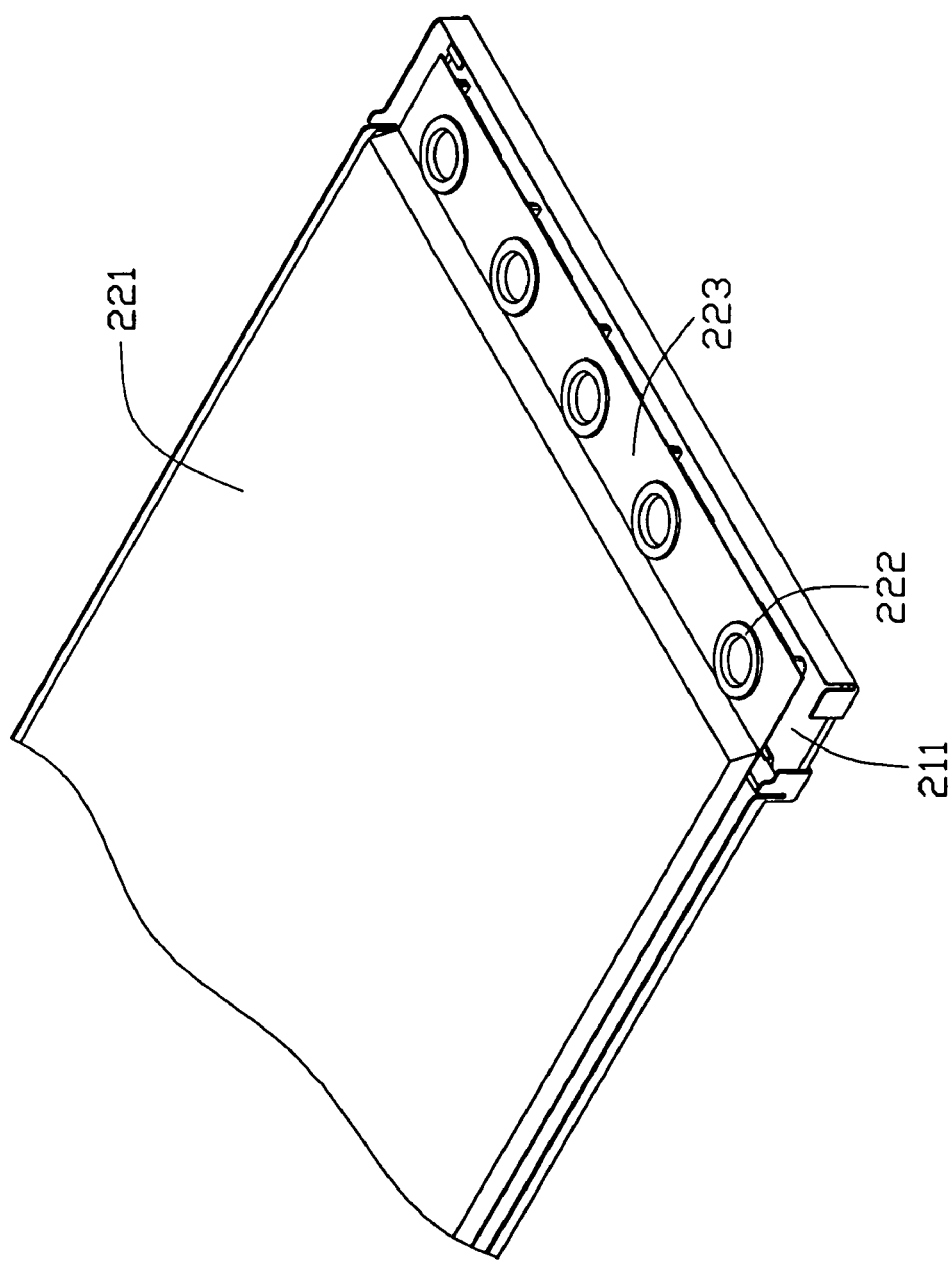
FIG. 3 is an enlarged, assembled, perspective view of a reflective sheet, a light source device and a light guide plate as shown in FIG. 2.
Figure 4:
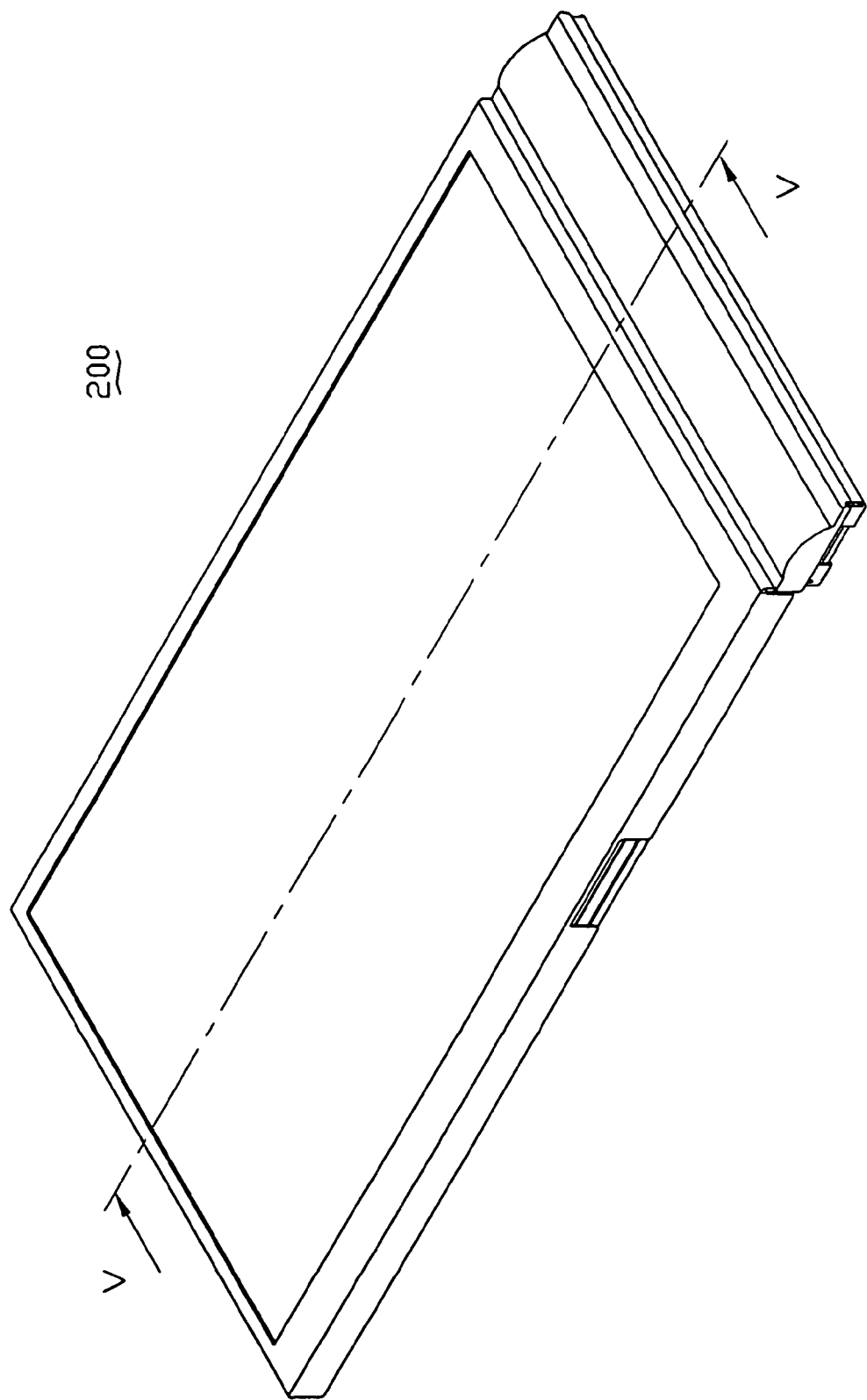
FIG. 4 is an enlarged, assembled, perspective view of the display device as shown in FIG. 2.
Figure 5:
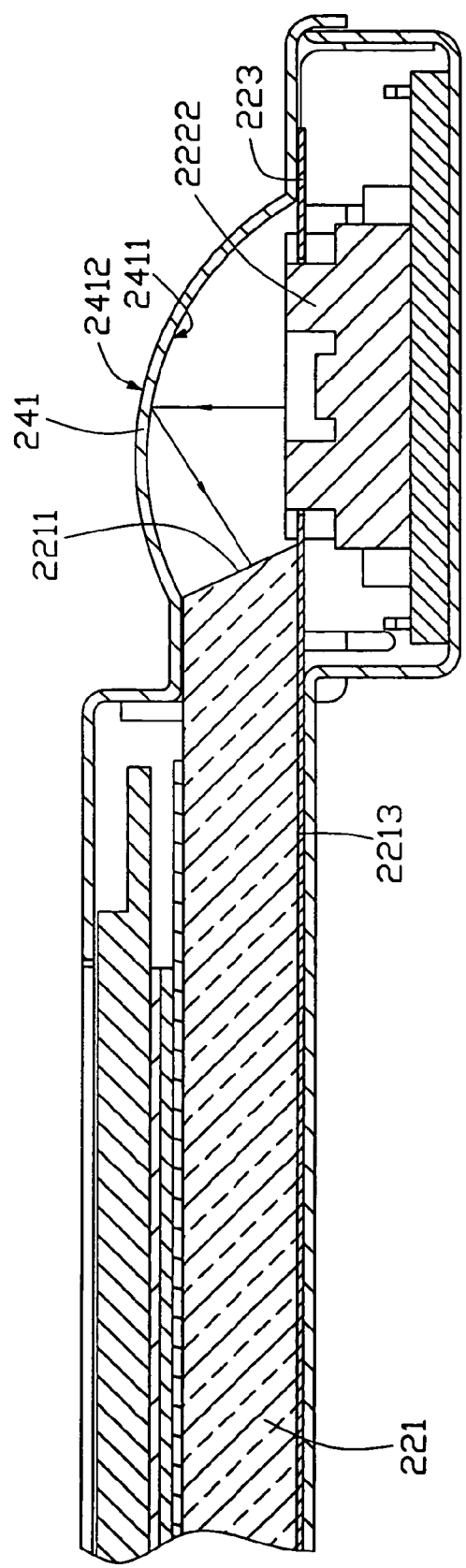
FIG. 5 is an enlarged, schematic, partially cross-sectional view taken along line V-V of FIG. 4.

Referring to FIGS. 3 through 5, the locking portion 241 is substantially a curved portion. The locking portion 241 has an inner surface 2411 and an outer surface 2412 on the opposite side of the inner surface 2411. The inner surface 2411 and the outer surface 2412 are both smooth surfaces. The locking portion 241 can be made of metals, alloys, or plastic materials. The material of the locking portion 241 can preferably be selected, for example, from a group consisting of copper (Cu), aluminum (Al), iron (Fe), titanium (Ti) and/or an alloy thereof.

The backlight module 220 includes a plate-like light guide member 221, a light source device 222, a reflective sheet 223, and an optical correcting unit 250. The light guide plate 221 is configured for converting point/line light sources into surface light sources with a uniform light energy distribution. The light guide plate 221 includes a light incident surface 2211, a light emitting surface 2212 connected with the light incident surface 2211, and a bottom surface 2213 facing an opposite direction of the light emitting surface 2212. The shape of the light guide plate 221 may be flat or wedged.

The groove 211 of the first frame 210 is located at one end of the light incident surface 2211 of the light guide plate 221. The light source device 222 is received in the groove 211 of the first frame 210. The light source device 222 includes a base 2221 and a plurality of lamps 2222 regularly arranged on the base 2221 to define a common light output surface thereon substantially parallel to the base 2221. In the illustrated embodiment, the lamps 2222 are light emitting diodes (LEDs).

The reflective sheet 223 is located between the first frame 210 and the bottom surface 2213 of the light guide plate 221. A plurality of holes 2231 is defined at one end of the reflective sheet 223. The quantity, shape and size of the holes 2231 correspond to the lamps 2222, such that each hole 2231 is engaged with one of the lamps 2222.

The optical correcting unit 250 is located between the light emitting surface 2212 of the light guide plate 221 and the display panel 230. The optical correcting unit 250 includes a diffusion sheet 251, a first brightness enhancement film 252, and a second brightness enhancement film 253, stacked in that order such that the diffusion sheet 251 engages with the light guide plate 221. The optical correcting unit 250 further includes a hook light sheet (not shown). The display panel 230 is located between the optical correcting unit 250 and the second frame 240.

When the display device 200 is in use, light produced by the light source device 222 is emitted towards the inner surface 2411 of the locking portion 241, the light is then reflected to the light incident surface 2211 of the light guide plate 221. In order to add an intensity of light, an angle defined by the light incident surface 2211 relative to the bottom surface 2212 of the light guide plate 221 is in a range from about 0 to about 90 degrees. The locking portion 241 is configured for delivering light produced by the light source device 222 to the light incident surface 2211, and for dispersing heat produced by the light source device 222. Furthermore, to improve the reflectivity of the inner surface 2411, a reflective film (not shown) may be coated on the inner surface 2411 of the locking portion 241.

Figure 6:
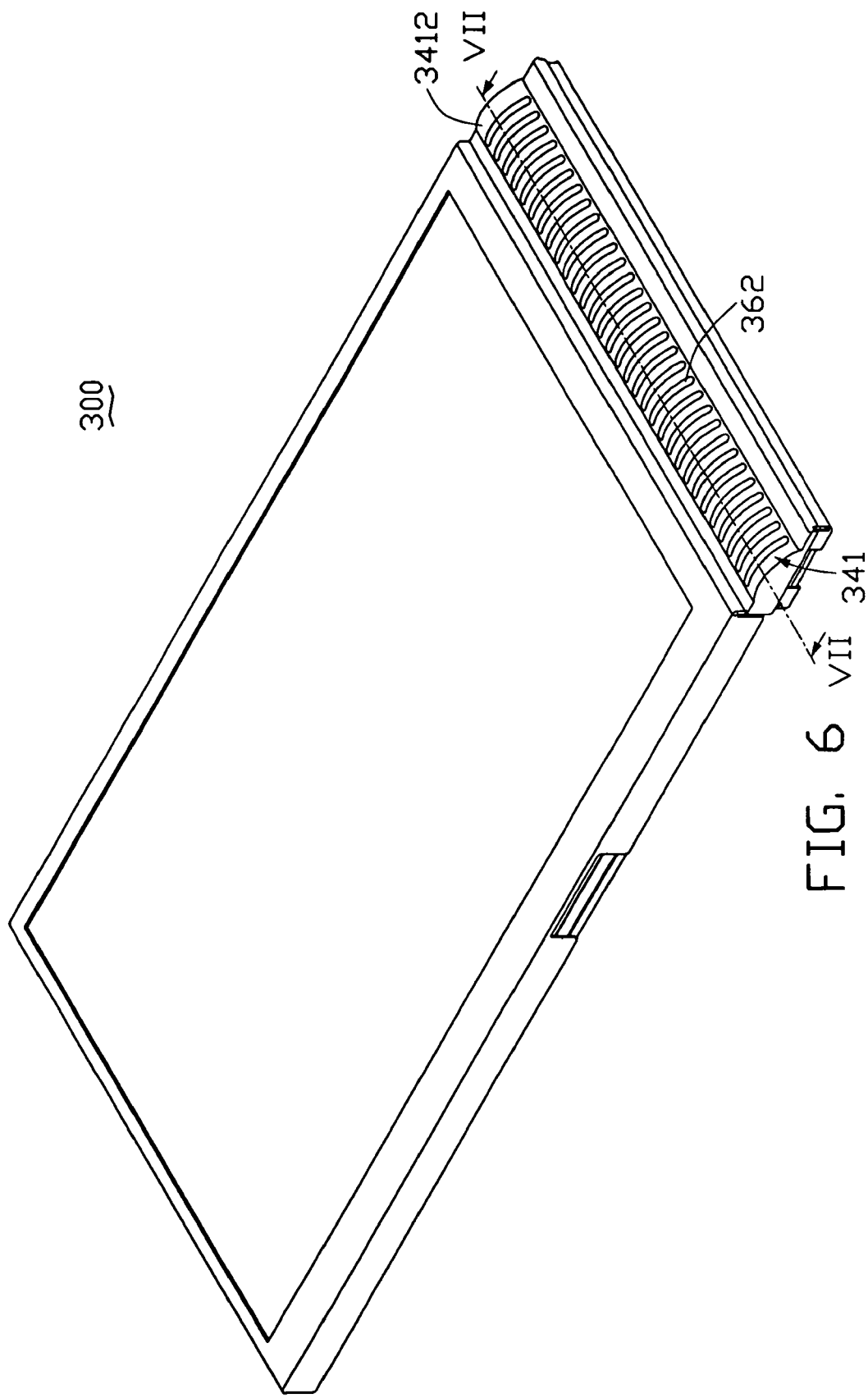
FIG. 6 is a schematic, perspective view of a display device in accordance with a second embodiment of the present invention.
Figure 7:
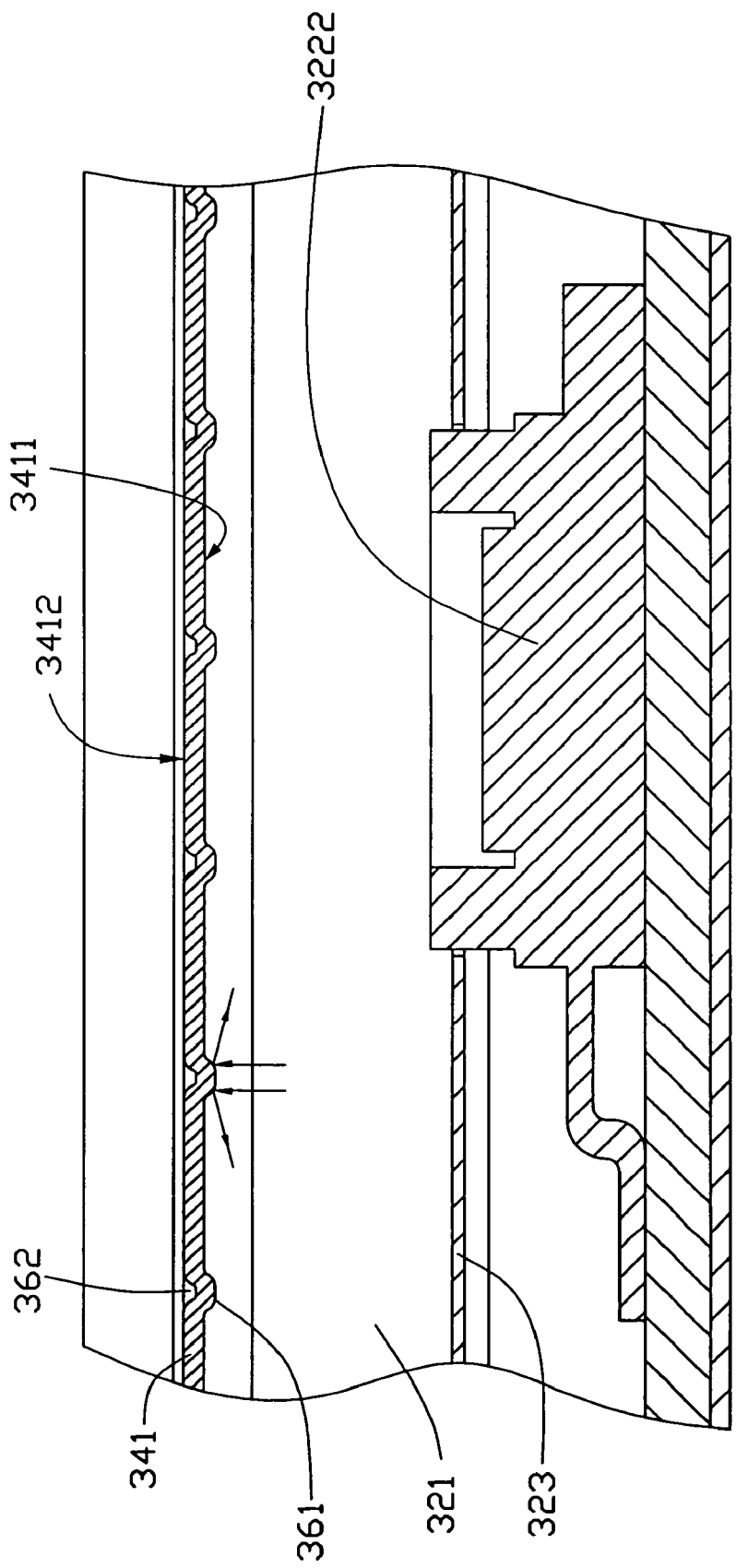
FIG. 7 is an enlarged, schematic, partially cross-sectional view taken along line VII-VII of FIG. 6.

Referring to FIGS. 6 and 7, a display device 300 according to a second embodiment of the present invention, is similar in principle to the display device 200 described previously, except that the reflector, i.e., an inner surface 3411 and an outer surface 3412 of the locking portion 341 are not smooth surfaces. The locking portion 341 further includes a plurality of barred protrusions 361 formed on the inner surface 3411, and a plurality of barred recesses 362 formed on the outer surface 3412. Each barred recess 362 corresponds with one barred protrusion 361.

When the display device 300 is in use, light produced by a lamp 3222 is emitted towards the inner surface 3411 of the locking portion 341, the light is then scattered by the barred protrusions 361. This results in that some light is reflected to a light guide plate 321, and some light is scattered to a reflective sheet 323. The holes 2231 of the reflective sheet 323 are tightly engaged with the lamps 3222, so light scattered to the reflective sheet 323 is reflected back towards the inner surface 3411 until it is eventually reflected to the light guide plate 321. Thus, the intensity of the light incident on the light guide plate 321 would be more uniform. On the other hand, heat produced by the lamps 3222 is dispersed via the locking portion 341, the design of the barred protrusions 361 and the barred recesses 362 of the locking portion 341 can increase a heat dissipation area. Since heat exchange is directly proportional to the heat dissipation area, the display device 300 will have an improved heat dissipation performance.

Figure 8:
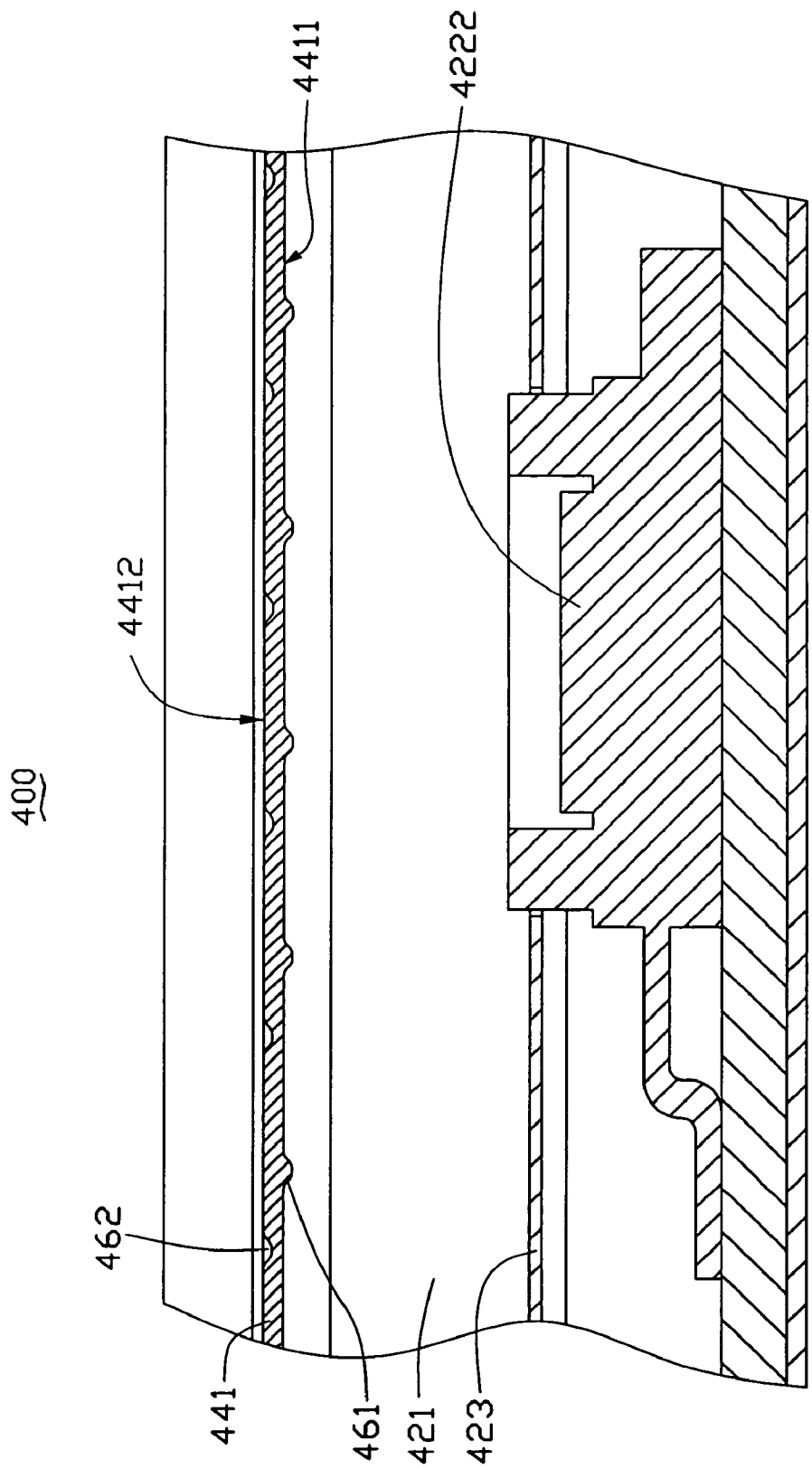
FIG. 8 is a schematic, partially cross-sectional view of a display device in accordance with a third embodiment of the present invention.

Referring to FIG. 8, a display device 400 according to a third embodiment of the present invention, is similar in principle to the display device 300 described previously, except that barred recesses 462 of an outer surface 4412 are displaced with barred protrusions 461 of an inner surface 4411 of a locking portion 441, such that each barred recess 462 is not vertically aligned with any barred protrusions 461.

Figure 9:
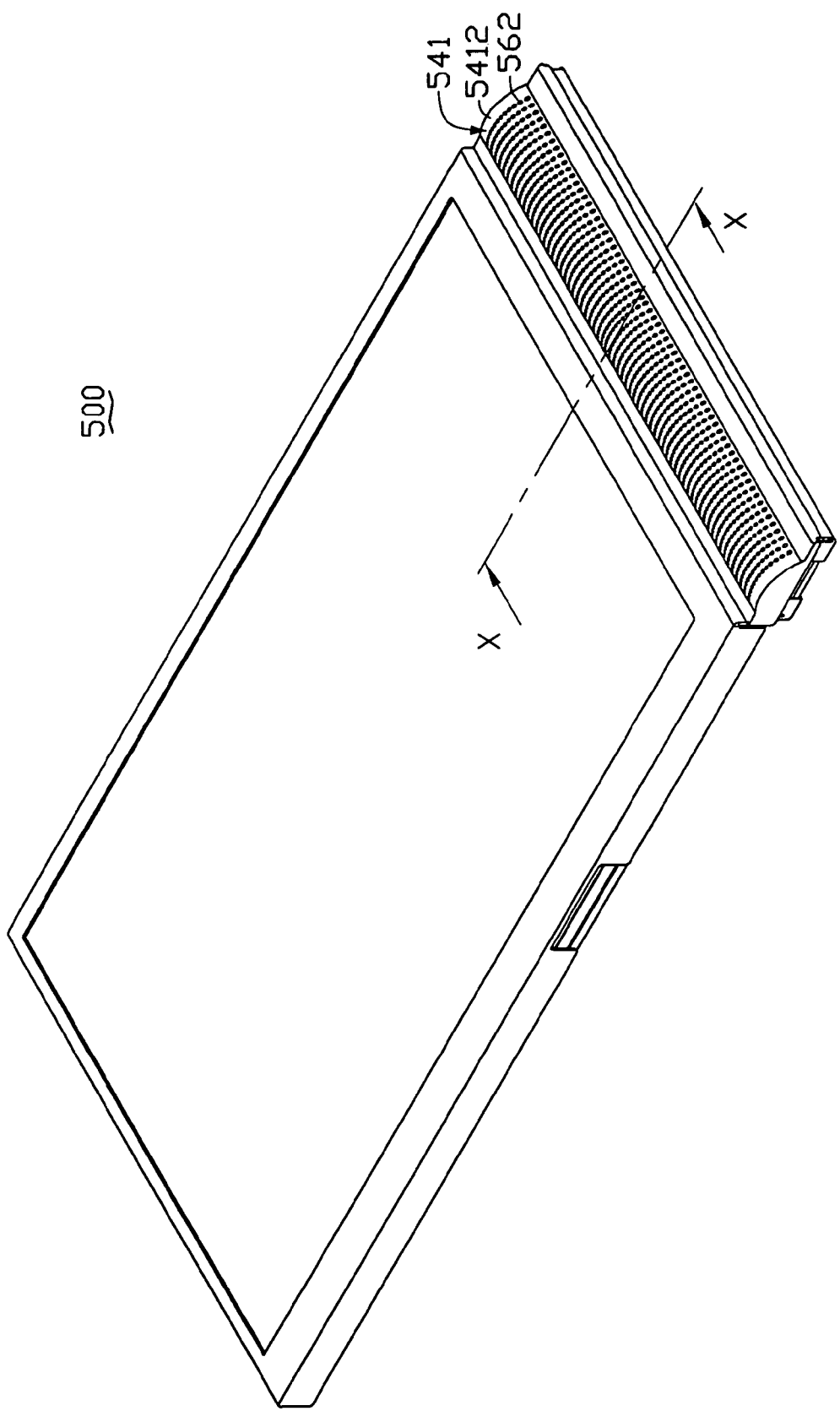
FIG. 9 is a schematic, perspective view of a display device in accordance with a fourth embodiment of the present invention.
Figure 10:
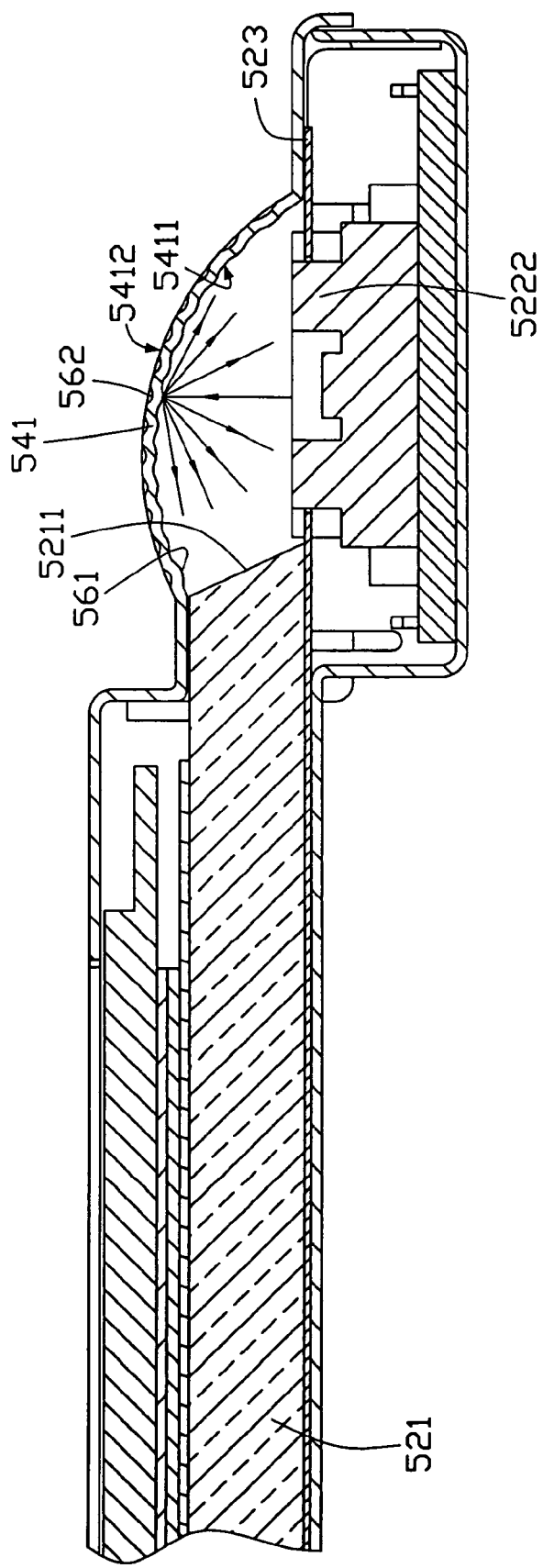
FIG. 10 is an enlarged, schematic, partially cross-sectional view taken along line X-X of FIG. 9.

Referring to FIG. 9 and FIG. 10, a display device 500 according to a fourth embodiment of the present invention, is similar in principle to the display device 200 described previously, except that an inner surface 5411 and an outer surface 5412 of the locking portion 541 are not smooth surfaces. The locking portion 541 further includes a plurality of patterned dots formed on both the inner surface 5411 and the outer surface 5412. A shape of each patterned dot can be of a protruding dot or a recessing dot. In the illustrated embodiment, the locking portion 541 includes a plurality of protruding dots 561 formed on the inner surface 5411, and a plurality of recessing dots 562 formed on the outer surface 5412. Each recessing dot 562 corresponds with one protruding dot 561.

When the display device 500 is in use, light produced by a lamp 5222 is emitted towards the inner surface 5411 of the locking portion 541, light is then scattered by the protruding dots 561. As a result, some light is reflected to the light incident surface 5211 of a light guide plate 521, and some light is scattered to the reflective sheet 523. The reflective sheet 523 is tightly engaged with the lamp 5222, so light scattered to the reflective sheet 523 is reflected back towards the inner surface 5411 until it is eventually reflected to the light guide plate 521. Thus, the intensity of light incident on the light guide plate 521 would be more uniform. On the other hand, heat produced by the lamps 5222 is dispersed via the locking portion 541, the design of the protruding dots 561 and the recessing dots 562 of the locking portion 541 can increase a heat dissipation area. Since heat exchange is directly proportional to the heat dissipation area, the display device 500 will have an improved heat dissipation performance.

Figure 11:
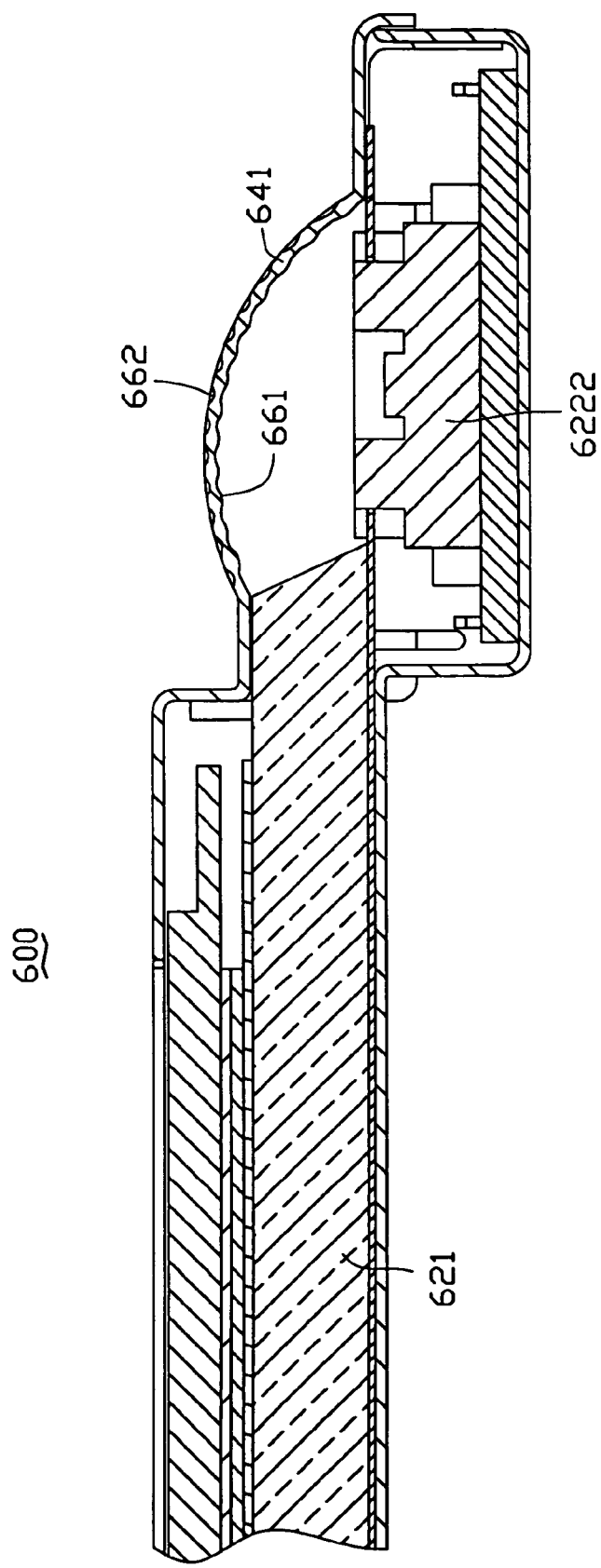
FIG. 11 is a schematic, partially cross-sectional view of a display device in accordance with a fifth embodiment of the present invention.

Referring to FIG. 11, a display device 600 according to a fifth embodiment of the present invention, is similar in principle to the display device 500 described previously, except that recessing dots 662 of an outer surface 6412 are displaced with protruding dots 661 of an inner surface 6411 of a locking portion 641, such that each recessing dot 662 is not vertically aligned with any protruding dots 661.

In other alternative embodiments, the inner surface and the outer surface of the locking portion may be formed with any combination consisting of a smooth surface, a plurality of barred recesses, barred protrusions and patterned dots.

Compared with a typical display device, the present display device has the following advantages. Firstly, the locking portion of the second frame has a function of a reflector, which can increase the utilization efficiency of light energy of the backlight module while decreasing cost. Secondly, the locking portion is a part of the second frame so as to lower light energy loss. Thirdly, since the heat produced by the light sources device is conducted to the locking portion of the second frame, and the locking portion of the second frame is directly contacted with the ambient environment, therefore, heat can be dispersed more rapidly. Finally, the design of the barred protrusions/protruding dots or barred recesses/recessing dots of the locking portion of the second frame can increase a heat dissipation area. Since heat exchange is directly proportional to the heat dissipation area, the display device will have an improved heat dissipation performance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display device comprising:
   a first frame having a groove defined at one end thereof;
   a backlight module, the backlight module comprising: a light guide plate having a light incident surface, a light emitting surface and a bottom surface, and a light source device located at one end of the light incident surface of the light guide plate and received in the groove of the first frame;
   a display panel located between the backlight module and the second frame; and
   a second frame having a locking portion according to the groove, wherein the locking portion is engaged with the groove, the first frame is engaged with the second frame; light emitted from the light source device is reflected by the locking portion, and finally entering the light guide plate.

2. The display device as claimed in claim 1, wherein the first frame and the second frame are respectively integrated.

3. The display device as claimed in claim 1, wherein the locking portion is a curved portion, and the locking portion has an inner surface and an outer surface on the opposite side of the inner surface.

4. The display device as claimed in claim 3, wherein a material of the locking portion can be selected from the group consisting of metal, alloy, and plastic.

5. The display device as claimed in claim 3, wherein the inner surface and the outer surface of the locking portion are both smooth surfaces.

6. The display device as claimed in claim 3, wherein the locking portion comprises a plurality of barred protrusions formed on the inner surface, and a plurality of barred recesses formed on the outer surface.

7. The display device as claimed in claim 6, wherein each barred protrusion is aligned with the barred recess.

8. The display device as claimed in claim 3, wherein the locking portion comprises a plurality of patterned dots formed on both the inner surface and the outer surface.

9. The display device as claimed in claim 8, wherein a shape of each patterned dots is selected from one of a protruding dot and a recessing dot.

10. The display device as claimed in claim 3, wherein the locking portion comprises a plurality of patterned dots formed on the inner surface, and the outer surface of the locking portion is a smooth surface.

11. The display device as claimed in claim 3, wherein the locking portion comprises one of barred recesses and barred protrusions formed on the inner surface, and the outer surface of the locking portion is a smooth surface.

12. The display device as claimed in claim 3, wherein the locking portion comprises a plurality of patterned dots formed on the outer surface, and the inner surface of the locking portion is a smooth surface.

13. The display device as claimed in claim 3, wherein the locking portion comprises one of barred recesses and barred protrusions formed on the outer surface, and the inner surface of the locking portion is a smooth surface.

14. The display device as claimed in claim 3, wherein the locking portion comprises one of barred recesses and barred protrusions formed on both the inner surface and the outer surface.

15. The display device as claimed in claim 1, wherein the backlight module further comprises a reflective sheet that is located between the first frame and the bottom surface of the light guide plate.

16. The display device as claimed in claim 15, wherein an angle defined by the light incident surface relative to the bottom surface of the light guide plate is in a range from about 0 to about 90 degrees.

17. The display device as claimed in claim 15, wherein the light source device comprises a plurality of light emitting diodes, a plurality of holes is defined at one end of the reflective sheet, with each hole corresponding to one light emitting diode, and being engaged with the light emitting diode.

* * * * *